INVENTOR:

CARLO ERNESTO VALENTE

By Silverman, Mullin, Cass & Kaufman
ATTORNEYS

United States Patent Office 3,232,213
Patented Feb. 1, 1966

3,232,213
PERCOLATING UNIT FOR COFFEE MACHINES
Carlo Ernesto Valente, Via G. Ventura 5, Milan, Italy
Filed Apr. 19, 1963, Ser. No. 274,264
Claims priority, application Italy, Apr. 28, 1962,
8,518/62
2 Claims. (Cl. 99—302)

This invention concerns percolating units for coffee machines.

The percolator apparatus concerned herein differs from the apparatus commonly referred to in the United States as percolators. In the apparatus concerned herein, the hot percolating liquid is caused to pass only once through a filter bed containing ground or powdered coffee. The liquid is introduced to the mass of coffee and permitted to percolate through or infuse said mass to extract the soluble essences therefrom and passing from the filter bed immediately to the container for serving. In the United States the term "percolator" commonly has come to refer to a particular type of coffee maker wherein a boiling liquid is permitted to rise in a tube for deflection downwardly, and repeatedly, into and through a perforated basket containing ground coffee. Thus, it can be seen that the percolator apparatus concerned herein differs from the ordinary percolator in that the herein apparatus does not permit repeated cycling of the liquid through the ground coffee.

In known coffee percolators a bayonet type fixing is usually provided for locking the filter holder in position relative to the body of the percolator.

As is well known, the rotary movement necessary for the locking operation requires a considerable effort on the part of the operator, and is a cause of permature wear of the rubber packing embedded in the disc against which the filter holder is hermetically sealed; this premature wear is even hastened by the fact that the surface of the rim of the filter, which slides over the packing under pressure, retains traces of coffee powder.

Another cause of premature wear of the packing consists in the fact that the operator is inclined, to ensure a tight seal, to rotate the filter holder excessively, thus compressing the packing more than is necessary and squashing it.

It is among the objects of the present invention to eliminate these disadvantages.

Accordingly, it is the important object of the invention to provide a percolating unit for a coffee making apparatus of the character described wherein said apparatus includes tap means adapted to be coupled to a source of percolating fluid, first means for holding a spray rose to distribute said percolating fluid forceably through a mass of ground coffee, second means for supporting a permeable filter element thereon containing the mass of ground coffee, sealing means carried on to said first means cooperable with said second means to effect a seal therebetween, said first and second means mounted for axial slidable movement, one relative to the other to a first condition wherein said first and second means are in a sealed relationship and a second condition wherein said first and second means are in a non-sealed relationship, the invention being characterized by the provision of hydraulic actuating means operable to drive said first and second means to the aforementioned first condition and spring means normally biasing said first and second means in the second condition and operable to return said first and second means automatically to the aforementioned second condition, said hydraulic actuating means including a cylinder housing and a piston slidably and sealingly movable within said housing, said hydraulic actuating means hydraulically operable only in one direction against the normal bias of said spring means to drive said first and second means to said first condition, said second means having horizontal track or guide means as a part thereof to permit said permeable element to be horizontally movable to permit withdrawal and replacement thereof, and fluid conduit means for supplying said percolating fluid to said spray rose only when the aforementioned first and second means are in the said aforementioned first condition.

Thus, according to the present invention operating units for coffee machines, particularly of the type provided with an ordinary tap, is characterized by the part holding the spray rose for distributing the infusion water and the sealing packing for the filter holder and the part supporting the filter holder with the filter being arranged to slide axially in relation to each other, and respectively being integral with the reciprocally moving parts of a hydraulic cylinder, such parts being relatively moved in one direction by hydraulic pressure against the force of a spring which holding the filter holder in the non-sealing position, and in that the part supporting the filter holder has horizontal guides provided therefor.

The invention will now be described further by way of example only with reference to the accompanying drawings illustrating two embodiments thereof and in which.

Figures 1, 2:
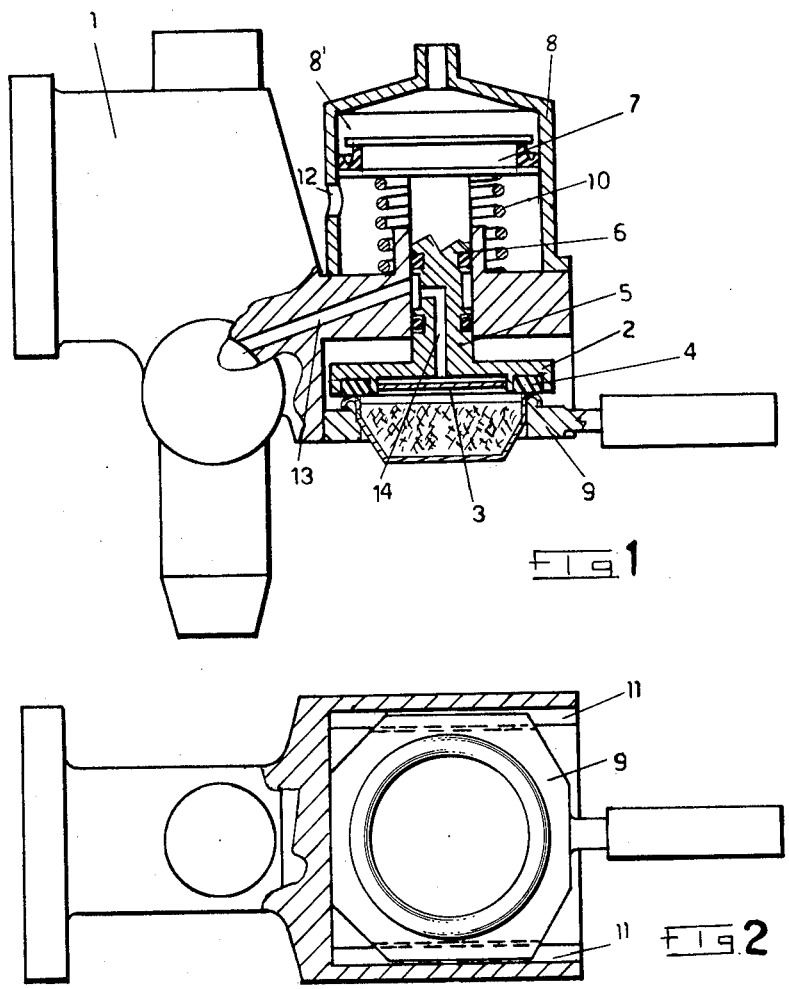
FIG. 1 shows a side elevation, partly in axial section, of a percolating unit in accordance with the invention.
FIG. 2 is a plan view corresponding to FIG. 1.

Referring now to the drawings and in particular to FIGS. 1 and 2 thereof, 1 indicates the percolator unit of continuous flow type, i.e. including an ordinary tap means suitable, when the handle is turned for putting the jet of hot water for infusion into communication with the infusion chamber above the filter.

In a unit of this type, in accordance with the invention, the moving lower surface of the disc 2, holding the spray rose 3 and the embedded packing 4, is formed at one end of a rod 5 sliding through a sealed opening 6 in the body of the unit; this rod terminates at the other end in a piston 7 sliding in a cylinder 8 and moving in its downward movement against the force of the spring 10.

The cylinder is mounted on the unit, and the unit is adapted to receive the filter holder 9, the said unit having two lateral guides 11 for its insertion of the holder 9.

The piston 7 is provided with a peripheral packing whilst the wall of the cylinder, in correspondence with the chamber below the piston, is provided with a hole 12 communicating with the outside atmosphere.

The chamber 8' above the piston of the cylinder 8 can be connected to the water of the hydraulic circuit of the machine whenever the filter holder is inserted and before the percolating tap is opened.

Its method of operation is therefore as follows.

The pressure is the upper chamber 8' of the cylinder 8, overcoming the force of the spring, presses the piston 7 downwards and thus also the moving lower surface of the disc 2, compressing the sealing packing 4 against the rim of the filter holder 9.

In the meantime, the percolator tap has been opened and the infusion water, passing through channels 13 and 14, and distributed by the spray rose soaks the coffee powder, and is then expelled from it, collecting in the cups below.

When percolation of the beverage has been completed, the flow of the water into the upper chamber 8' of the cylinder 8 is suspended by known means, and under the action of the spring, the piston rises again and the pressure of the packing on the filter holder is relaxed, and the latter can easily be extracted.

Everything is ready for the next preparation of the beverage.

What is claimed is:

1. A percolating unit for a coffee making apparatus of the character described wherein said apparatus includes tap means adapted to be coupled to a source of percolating fluid, first means for holding a spray rose to distribute said percolating fluid forceably through a mass of ground coffee, second means for supporting a permeable filter element thereon containing the mass of ground coffee, sealing means carried on said first means cooperable with said second means to effect a seal therebetween, said first and second means mounted for axial slidable movement one relative to the other to a first condition wherein said first and second means are in a sealed relationship and a second condition wherein said first and second means are in a non-sealed relationship, the invention being characterized by the provision of fluid pressure actuated means operable to drive said first and second means to the aforementioned first condition and spring means normally biasing said first and second means in the second condition and operable to return said first and second means automatically to the aforementioned second condition, a cylinder housing and a piston slidably and sealingly moveable within said housing, a source of fluid pressure, means for introducing fluid pressure within the cylinder only in one direction upon the piston and against the normal bias of said spring means to drive said first and second means to said first condition, said second means having horizontal track means as a part thereof to permit said permeable filter element to be horizontally movable to permit withdrawal and replacement thereof, the housing and the said first means each having one of a pair of channels formed therein, the channel formed in the housing communicating between the tap means and said first means and the channel formed in the first means communicating between the housing and the spray rose, the said channels being placed in inter-communicating relationship by the fluid pressure exerted against said piston and only when the first and second means are positioned in the aforementioned first condition for introduction of percolating fluid from the source to the spray rose only during the aforementioned first condition.

2. A percolating unit for a coffee making machine of the character described having a conventional tap source of percolating fluid, said unit comprising a body portion having first and second support means coupled thereto, said first and second support means mounted for relative axial slidable relationship one to the other, said first support means carrying a spray rose for distributing the percolating fluid to a mass of powdered coffee and said second support means carrying a lipped filter holder having a permeable filter container set therein carrying a mass of powdered coffee of predetermined quantity, a hydraulic cylinder including a cylinder housing and a spring biased piston mounted therein, said piston carrying said first support means, said cylinder having fluid inlet means on one side of said piston and air outlet means on the opposite side of the piston, means for introducing a fluid pressure to said cylinder through said inlet to overcome the spring bias of said piston and urge the first support means and said lipped filter holder one toward the other to bring same into sealing relation one with the other, and cooperative sealing means carried by said first support means for forming a sealed engagement with the lipped filter holder, the cylinder housing having a first bore formed therein communicating between the said tap source of percolating fluid and the first support means, the first support means having a second bore formed therein communicating between the cylinder housing and the spray rose, said first and second bores assuming a normal non-communicating relationship therebetween at all times except when the said fluid pressure is applied to the piston within the cylinder to bring the lipped filter holder in sealing relation with said first support means, said first and second bores then serving as fluid conduit means to introduce percolating fluid forceably through the spray rose from the source thereof to infuse the same during a single pass through the mass carried in the filter container thereby to extract the coffee essences therefrom and discharge the fluid containing said extract essences.

References Cited by the Examiner
UNITED STATES PATENTS 2,529,395  11/1950  Hummel _____ 99—302

FOREIGN PATENTS 1,167,814  8/1958  France.
571,853  1/1958  Italy.

WALTER A. SCHEEL, Primary Examiner.

JEROME SCHNALL, ROBERT E. PULFREY,
Examiners.